(12) United States Patent
Basu et al.

(10) Patent No.: US 11,474,743 B2
(45) Date of Patent: Oct. 18, 2022

(54) DATA MODIFICATION

(71) Applicant: Micron Technology, Inc., Boise, ID (US)

(72) Inventors: Reshmi Basu, Boise, ID (US); Libo Wang, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/992,161

(22) Filed: Aug. 13, 2020

(65) Prior Publication Data
US 2022/0050628 A1  Feb. 17, 2022

(51) Int. Cl.
G06N 5/02 (2006.01)
G06F 3/06 (2006.01)
G06F 21/78 (2013.01)

(52) U.S. Cl.
CPC .......... G06F 3/0659 (2013.01); G06F 3/0604 (2013.01); G06F 3/0673 (2013.01); G06F 21/78 (2013.01); G06N 5/02 (2013.01)

(58) Field of Classification Search
None
See application file for complete search history.

(56) References Cited

U.S. PATENT DOCUMENTS

| | | | | |
|---|---|---|---|---|
| 6,064,748 A * | 5/2000 | Hogan | ................... | H04N 19/30 348/461 |
| 7,102,552 B1 * | 9/2006 | Archbold | ................ | H03M 7/30 341/50 |
| 9,106,347 B2 * | 8/2015 | Ramaswamy | ......... | H04H 20/33 |
| 10,714,176 B2 | 7/2020 | Frederiksen | | |
| 10,735,193 B1 | 8/2020 | Knas et al. | | |
| 10,956,770 B1 * | 3/2021 | Lerner | ...................... | G09G 5/14 |
| 2012/0310893 A1 * | 12/2012 | Wolf | ...................... | G06F 16/958 707/661 |
| 2013/0300887 A1 | 11/2013 | Ward et al. | | |
| 2014/0195594 A1 * | 7/2014 | Ahuja | ............... | H04N 21/25816 709/203 |
| 2017/0054895 A1 | 2/2017 | Wan et al. | | |
| 2019/0081637 A1 * | 3/2019 | Pool | .................... | H03M 7/3079 |
| 2020/0089623 A1 | 3/2020 | Chen et al. | | |
| 2020/0089626 A1 | 3/2020 | Murphy | | |

(Continued)

OTHER PUBLICATIONS

International Search Report and Written Opinion from related international application No. PCT/2021/040430, dated Oct. 26, 2021, 13 pages.

*Primary Examiner* — Elias Mamo
(74) *Attorney, Agent, or Firm* — Brooks, Cameron & Huebsch, PLLC

(57) ABSTRACT

Methods and systems associated with data modification are described. Examples can include receiving, at a controller of a device, data associated with a read or write command transmitted to a memory resource and modifying the data using logic before transmitting the data to a host or image sensor or before writing the data to the memory resource. The modification can include removing one or more bits from the data, reordering one or more bits of the data, changing a format of the data, or any combination thereof. The modified data can be transmitted to the host or image sensor or written to the memory resource. In some examples, a plurality of memory devices can combine modified data for transmitting to a host.

19 Claims, 4 Drawing Sheets

(56) References Cited

U.S. PATENT DOCUMENTS

| | | |
|---|---|---|
| 2020/0150884 A1 | 5/2020 | Pawlowski |
| 2020/0225853 A1 | 7/2020 | Gans |
| 2020/0250177 A1 | 8/2020 | Padmanabhan |
| 2020/0250295 A1 | 8/2020 | Padmanabhan |

\* cited by examiner

_US 11,474,743 B2_

DATA MODIFICATION

TECHNICAL FIELD

The present disclosure relates generally to systems and methods associated with data modification.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random-access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
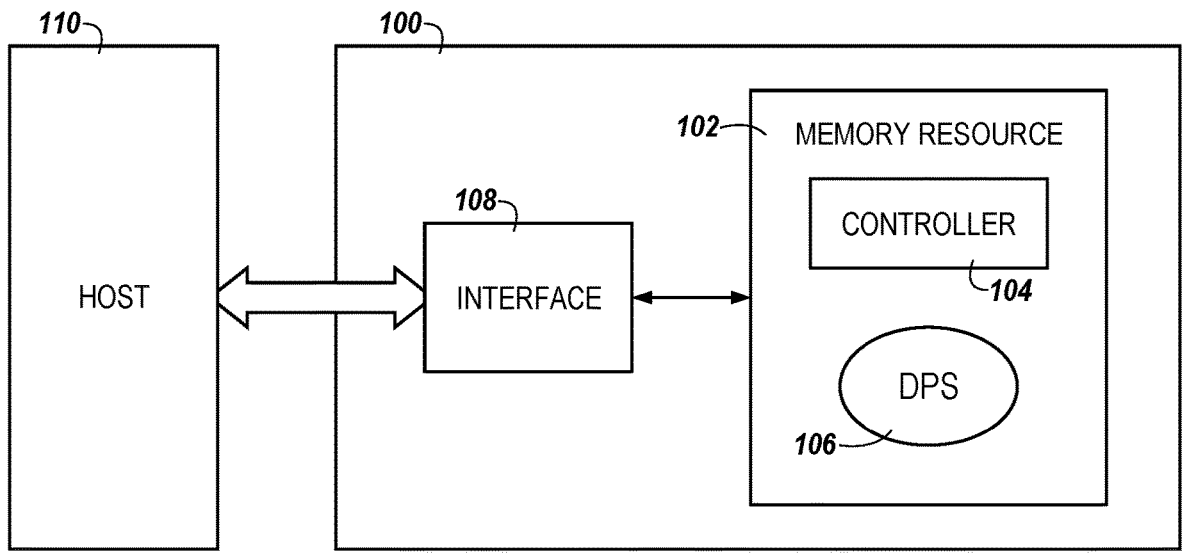
FIG. 1 is a diagram of an example system including a memory resource, a controller, and a device for modifying data in accordance with a number of embodiments of the present disclosure.

Systems and methods related to data modification are described. Examples can include a device such as a data preparation slice (DPS). As used herein, "data preparation slice", or "DPS", refers to a hardware accelerator, hardware intelligent chip, logic, software, or other device that is communicatively coupled to a controller and performs data modification (e.g., data preparation). In some examples, the DPS is located on a memory resource or is located on-disk. "Communicatively coupled," as used herein, can include coupled via various wired and/or wireless connections between devices such that data can be transferred in various directions between the devices. The coupling may not be a direct connection, and in some examples can be an indirect connection.

Data modification can include manipulating (e.g., cleaning and transforming) raw data prior to processing and analysis. Data modification can include reformatting data, making corrections to data, and combining data sets to put the data in a desired form (e.g., for efficient and accurate processing and analysis). In some examples, data modification can include standardizing data formats, sequencing data, enriching source data, removing outliers, loading data, data ingestion, data fusion, data cleaning, data augmentation, ordering data, summarizing/compressing data (e.g., mean, median, max, min, etc.), generating synthetic data, and data delivery, among others.

Examples of the present disclosure may allow for data modification at a device such as a DPS located on a memory resource or on-disk, allowing for modification co-located with data storage. This can reduce access to the data (raw and modified), which can increase security. Data processing efficiency can increase, in some examples, as the speed with which the raw data can be retrieved from storage and modified can be increased. This can also increase security, as data that travels an increased distance for an increased time may be more susceptible to loss or corruption. Examples of the present disclosure can reduce a dependency on a data modification service separate from a data storage location. Some examples of the present disclosure can allow for modification of data upon receipt from a host, for example, such that the data can be stored as modified data (e.g., versus raw data). This can reduce an amount of data being sent through an interface, which can reduce costs, reduce bandwidth requirements, and increase security.

Examples of the present disclosure can include receiving, at a controller of a device, data associated with a read command or write command transmitted to a memory resource and modifying the data using logic communicatively coupled to the controller before transmitting the data to a host or image sensor or before writing the data to the memory resource. The modification can include removing one or more bits from the data, reordering one or more bits of the data, changing a format of the data, or any combination thereof. Such examples can include transmitting the modified data to the host or image sensor or writing the data to the memory resource based at least in part on the read command or the write command.

Other examples of the present disclosure can include a system including a memory resource. The memory resource can include a controller configured to manage data associated with the memory resource and a device such as a DPS communicatively coupled to the controller and configured to modify the data before transmitting the data to a host or image sensor or before writing the data to the memory resource, wherein the modification comprises removing one or more bits from the data, reordering one or more bits of the data, changing a format of the data, or any combination thereof.

Yet other examples of the present disclosure can include a system including a storage device communicatively coupled to a host and a combined device such as a combined DPS. The storage device can include a first memory resource including a first controller configured to manage data associated with the first memory resource and a first device communicatively coupled to the first controller and configured to modify the data associated with the first memory resource. The storage device can also include a second memory resource including a second controller configured to manage data associated with the second memory resource and a second device communicatively coupled to the second controller and configured to modify the data associated with the second memory resource. The modification in the first and the second device can include removing one or more bits from the data, reordering one or more bits of the data, changing a format of the data, or any combination thereof. The combined device can be configured to collect and combine the data modified by the first device and the data modified by the second device and transmit (e.g., communicate) the combined modified data to the host.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "M", "N", "P", etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 102 can reference element "02" in FIG. 1, and a similar element can be referenced as 202 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Multiple analogous elements within one figure may be referenced with a reference numeral followed by a hyphen and another numeral or a letter. For example, 442-1 may reference element 42-1 in FIG. 4 and 442-P may reference element 42-P, which can be analogous to element 42-1. Such analogous elements may be generally referenced without the hyphen and extra numeral or letter. For example, elements 442-1 and 442-P may be generally referenced as 442.

FIG. 1 is a diagram of an example system 100 including a memory resource 102, a controller 104, and a device (illustrated in FIG. 1 as a DPS 106) for modifying data in accordance with a number of embodiments of the present disclosure. In some examples, the controller 104 can include a processor, control circuitry, hardware, firmware, and/or software, among others. The memory resource 102 can include control circuitry in some examples and can be communicatively coupled to an interface 108 (e.g., a host interface) within the system 100, and the interface 108 can be communicatively coupled to a host 110. In some examples, the memory resource 102 includes a memory array.

The memory resource 102 can be coupled to the interface 108 (e.g., via the controller 104) via one or more channels and can be used to transfer data between the memory resource 102 and the host 110, which may have a host controller. The interface 108 can be in the form of a standardized interface (e.g., a storage interface). For example, when the memory resource 102 is used for data storage in the system 100 (e.g., a computing system), the interface 108 can be a serial advanced technology attachment (SATA), peripheral component interconnect express (PCIe), a non-volatile memory host controller interface, a universal serial bus (USB), or a double data rate (DDR) interface, among other connectors and interfaces. In general, however, interface 108 can provide an interface for passing control, address, data, and other signals between the memory resource 102 and the host 110 having compatible receptors for the interface 108.

The memory resource 102 can include non-volatile or volatile memory. Non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random-access memory (RRAM), ferroelectric random access memory (FeRAM), magnetoresistive random-access memory (MRAM), and programmable conductive memory, among other types of memory. Volatile memory can include random-access memory (RAM), dynamic random-access memory (DRAM), and static random-access memory (SRAM), among others.

The host 102 can be a host system such as a personal laptop computer, a head-mounted display, a vehicle, a desktop computer, a digital camera, a mobile telephone, an internet-of-things (IoT) enabled device, or a memory card reader, graphics processing unit (e.g., a video card), or a cloud service, among various other types of hosts. The host 110 can include a system motherboard and/or backplane and can include a number of memory access devices, (e.g., a number of processing resources (e.g., one or more processors, microprocessors, or some other type of controlling circuitry)). One of ordinary skill in the art will appreciate that "a processor" can intend one or more processors, such as a parallel processing system, a number of coprocessors, etc. The host 110 can be coupled to the interface 108 by a communication channel, in some examples.

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, vehicles, home appliances, sensors, smart home devices, monitoring devices, wearable devices, devices enabling intelligent shopping systems, among other cyber-physical systems.

In some examples, the host 110 can be responsible for executing an operating system for the system 100 that includes the memory resource 102. Accordingly, in some embodiments, the host 110 can be responsible for controlling operation of the memory resource 102. For example, the host 110 can execute instructions (e.g., in the form of an operating system) that manage the hardware of the system 100 such as scheduling tasks, executing applications, controlling peripherals, etc.

The computing system 100 can include separate integrated circuits or the host 110, the memory resource 102, the interface 108, and/or the controller 104, can be on the same integrated circuit. The system 100 can be, for instance, a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In some examples, the memory resource 102 can store data for the host 110. The host 110 may request the data, and the data can be provided to the host 110 as encrypted data. For instance, the DPS 106 can modify data stored as raw data at memory resource 102 or can modify data received from the host 110 and subsequently store the modified data at memory resource 102. Modification, in some examples, can be performed before transmitting the data to the host 110 or an image sensor or before writing the data to the memory resource 102, and the modification can include removing one or more bits from the data, reordering one or more bits of the data, changing a format of the data, or any combination thereof. Modification of the raw data by the DPS 106 (e.g., using logic) can include, for instance, sequencing the data, standardizing data formats, enriching source data, removing outliers, loading data, data ingestion, data fusion, data cleaning, data augmentation, and data delivery, among other data modification processes.

The controller 104 can manage the modified data by encrypting and encoding the data. For example, before sending the modified data to the host 110 via the interface 108, the controller 104 can encrypt and encode (e.g., error correct) the data for security. The controller 104 can receive the modified data from the DPS and transmit it to the host 110, for example. In some instances, managing the data can include the controller 104 receiving the data from the host 110 and communicating the data to the DPS for modification.

In a non-limiting example, the host 110 may be a cloud service. The host 110 provides raw data to the memory resource 102 (e.g., via the controller 104) for storage. When the host 110 requests the data from the controller 104 (e.g., via the interface 108), the DPS modifies the raw data, the controller encrypts and encodes the modified data (e.g., if requested by the host 110), and transmits the modified data to the host 110 (108) for processing and/or analysis. For instance, the raw data may include errors, outliers, extraneous data, missing values, private or sensitive data entries, non-conforming data, or a combination thereof that the DPS may remove, correct, standardize, or mask during modification. The host 110 can use the modify data as desired; for instance, a cloud service may run a particular algorithm on the modified data than may not be run on raw data.

In another non-limiting example, the host 110 provides raw data to the controller 104 via the interface 108 for eventual storage at memory resource 102. The controller 104 transmits the raw data to the DPS 106 for data modification and subsequently encrypts, encodes, and transmits the modified data to the memory resource 102 for storage as modified data. Whether the data is stored at the memory resource 102 as raw or modified data may depend on the host's 110 desire to reduce time storing the data (e.g., store raw data) with the knowledge that it may take time to modify the data at the DPS 106 before reading back the data versus the host's 110 desire to reduce time reading back the data (e.g., store modified data) with the knowledge that it may take time to modify the data at the DPS 106 before storing the data.

Although not illustrated in FIG. 1 as to not obscure the examples of the disclosure, the memory resource 102 can be communicatively coupled to image sensors which can be communicatively coupled to the host 110. As used herein, the term "image sensor" refers to a device that can generate and send image data and/or image receive data. Some examples of image sensors can include camera devices, video devices, among others. The image sensors may transmit data for storage in the memory resource 102. For example, the controller 104 can receive data from the plurality of image sensors.

In some examples, the DPS 106 can modify the received raw image data, which may be referred to as image data augmentation. For instance, modifying raw image data can include finding similar images within the raw image data, compiling images, synthesizing images, performing statistical data modification on the raw image data, etc.

Figure 2:
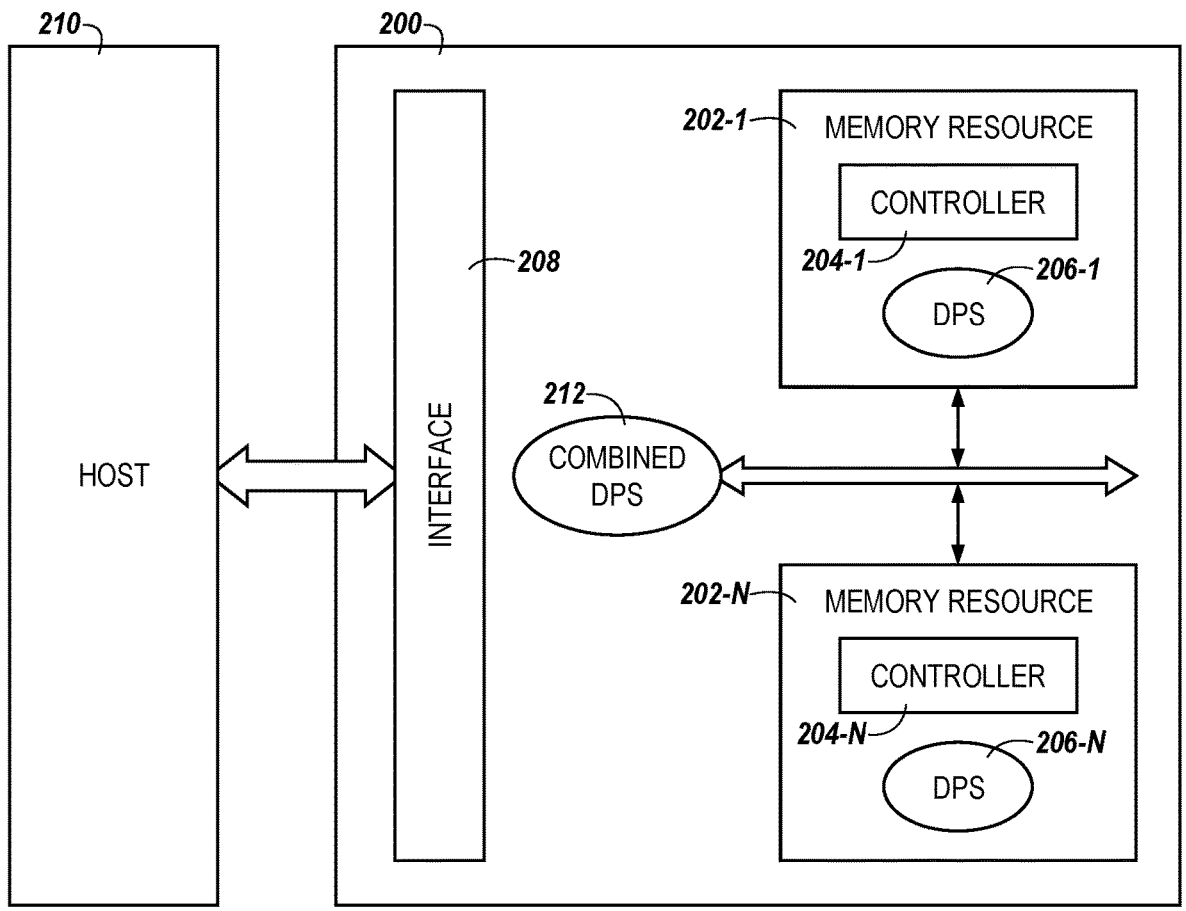
FIG. 2 is a diagram of an example system including memory resources, controllers, and devices for modifying data in accordance with a number of embodiments of the present disclosure.

FIG. 2 is a diagram of an example system 200 including memory resources 202-1, 202-N, controllers 204-1, 204-N, and devices (illustrated in FIG. 2 as DPSes 206-1, 206-N) for modifying data in accordance with a number of embodiments of the present disclosure. For instance, the system 200 may be a storage device such as an SSD communicatively coupled to the host 210 and can include a first memory resource 202-1 and a second memory resource 202-N. While two memory resources 202 are illustrated in FIG. 2, more or fewer memory resources may be present in system 200. The memory resources 202 can be a same type or a different type of memory resource. For example, the memory resource 202-1 may be configured to store a first data type while the memory resource 202-N may be configured to store a second data type. In a non-limiting example, the memory resource 202-1 is a volatile memory device and the memory resource 202-N is a non-volatile memory device. In some examples, the memory resources 202 are memory arrays.

The memory resources 202 may be a combination of electronic, magnetic, optical, or other physical storage device that stores executable instructions. Thus, the memory resources 202 may be, for example, non-volatile memory, volatile memory, or a combination thereof. In some examples, the memory resources 202 are non-transitory machine-readable media comprising RAM, an EEPROM, a storage drive, an optical disc, and the like.

The memory resource 202-1 can include a controller 204-1 configured to manage data associated with the memory resource 202-1 and a DPS 206-1 communicatively coupled to the controller 204-1 and configured to modify the data associated with the memory resource 202-1. The memory resource 202-N can include a controller 204-N configured to manage data associated with the memory resource 202-N and a DPS 206-N communicatively coupled to the controller 204-N and configured to modify the data associated with the memory resource 202-N. In some examples, the DPS 206-1 can include a processing resource and logic to modify the data associated with the memory resource 202-1, and the DPS 206-N can include a processing resource and logic to modify the data associated with the memory resource 202-N.

A combined device (illustrated here as DPS 212) can be in communication with the memory resources 202 and their respective controllers 204 to collect and combine the data modified by the DPSes 206 and transmit the combined modified data to the host 210 via the interface 208. For instance, the modified data can be transmitted to the combined DPS 221 via channels such as buses. Put another way, the system 200 can have an architecture such that memory resources 202 can be working at the same time (e.g., to store different data types), but together the memory resources 202 utilize one interface 208. For instance, if the memory resource 202-1 is a DRAM device, and the memory resource 202-N is a NAND device, data stored at the memory resource 202-1 and modified at the DPS 206-1 can be transmitted to the combined DPS 212 where it is combined with data stored at the memory resource 202-N and modified at the DPS 206-N, thereby combining data from different memory resource-types in the system 200 at combined DPS 212.

In some examples, the combined modified data can be transmitted to the host 210 at particular time intervals. For instance, in a non-limiting example, the modified data from the DPSes 206-1 and 206-N may include only relevant data determined during data modification. As such, blocks of data may not be sent continuously, but rather in particular time intervals such that blocks of relevant data are sent, reducing bandwidth requirements of continuous communication. Accordingly, modified data in the combined DPS 212 may be sent at particular time intervals as it is received or at other predetermined time intervals. In some instances, modified data from the DPSes 206 and/or the combined DPS 212 may be transmitted near-continuously. As used herein, "near-continuously" includes transmitting (e.g., sending, receiving, etc.) without meaningful breaks.

Figure 3:
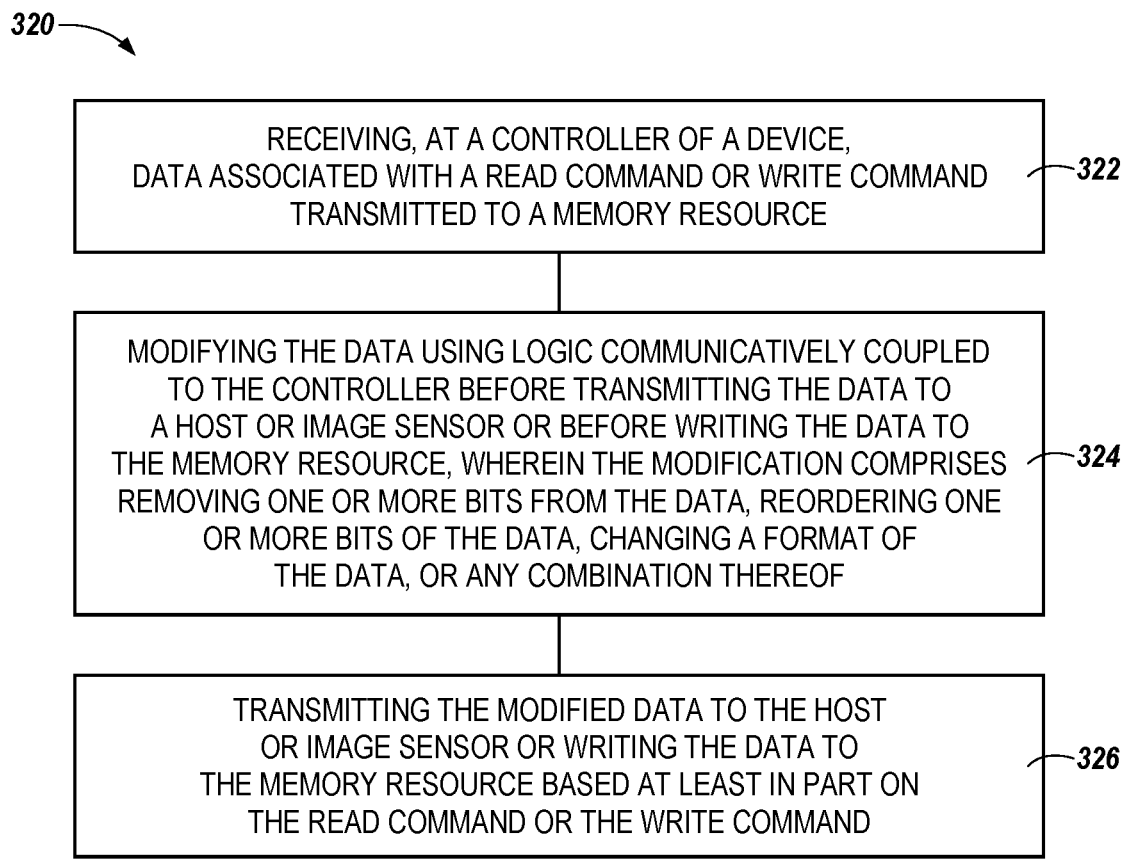
FIG. 3 is a flow diagram representing an example method associated with a device in accordance with a number of embodiments of the present disclosure.

FIG. 3 is a flow diagram representing an example method 320 associated with data modification in accordance with a number of embodiments of the present disclosure. The method 320 can be performed by a system or controller, such as the systems and/or controllers described with respect to FIGS. 1 and 2.

At 322, the method 320 can include receiving data at a controller (e.g., a storage controller) of a device, data associated with a read command or write command transmitted to a memory array. The device, for instance, can include a memory resource such as a volatile or non-volatile memory device or a computing device (e.g., providing on-disk storage). The data can be received at the controller from the device itself or from an outside device. For instance, the data may be received from a host, such as a cloud service, or can be received from the memory resource itself, for instance in response to data modification at a different device such as a DPS.

For example, the method 320, at 324, can include modifying the data using logic communicatively coupled to the controller before transmitting the data to a host or image sensor or before writing the data to the memory resource, wherein the modification comprises removing one or more bits from the data, reordering one or more bits of the data, changing a format of the data, or any combination thereof. For instance, the data can be modified at a DPS. The data can be modified at the DPS subsequent to being stored at the device or can be modified prior to being stored at the device. For instance, a host sending the data for storage and modification may indicate whether it is preferred to take time to modify the data before storage or take time to modify the data before reading it back to the host.

In some examples, modifying the data can include modifying image data. For instance, the data received at the controller, or a portion of the data, can be image data. For instance, raw image data may be synthesized as part of data modification at the DPS.

At 326, the method 320 can include transmitting the modified data to the host or image sensor or writing the data to the memory resource based at least in part on the read command or the write command. For instance, if the data is received from a host at the controller of a memory resource, the modified data can be written to the to the memory resource. In some instances, the modified data (and/or modified image data) can be encrypted, encoded, and written to the memory resource for storage. In an example when the data is received from a memory resource, the modified data can be transmitted to a host via an interface.

In some instances, the data can be received at a controller of a sensor of an edge device and the modified data can be transmitted to a server communicatively coupled to the sensor. For instance, as will be discussed further herein with respect to FIG. 4, data modification can occur at a DPS of an edge device (e.g., IoT enabled devices, sensors, etc.) and can be transmitted to or from an associated server via the controller.

The data, in some examples, can be received at a controller of a data node associated with an AI host and the modified data can be transmitted to the AI host communicatively coupled to the data node. For instance, as will be discussed further herein with respect to FIG. 5, data modification can occur at a DPS of the data node (e.g., a company's storage node) and can be transmitted to or from an associated AI host via the controller. An AI model (e.g., machine learning model), for instance, can be performed on the modified data.

Figure 4:
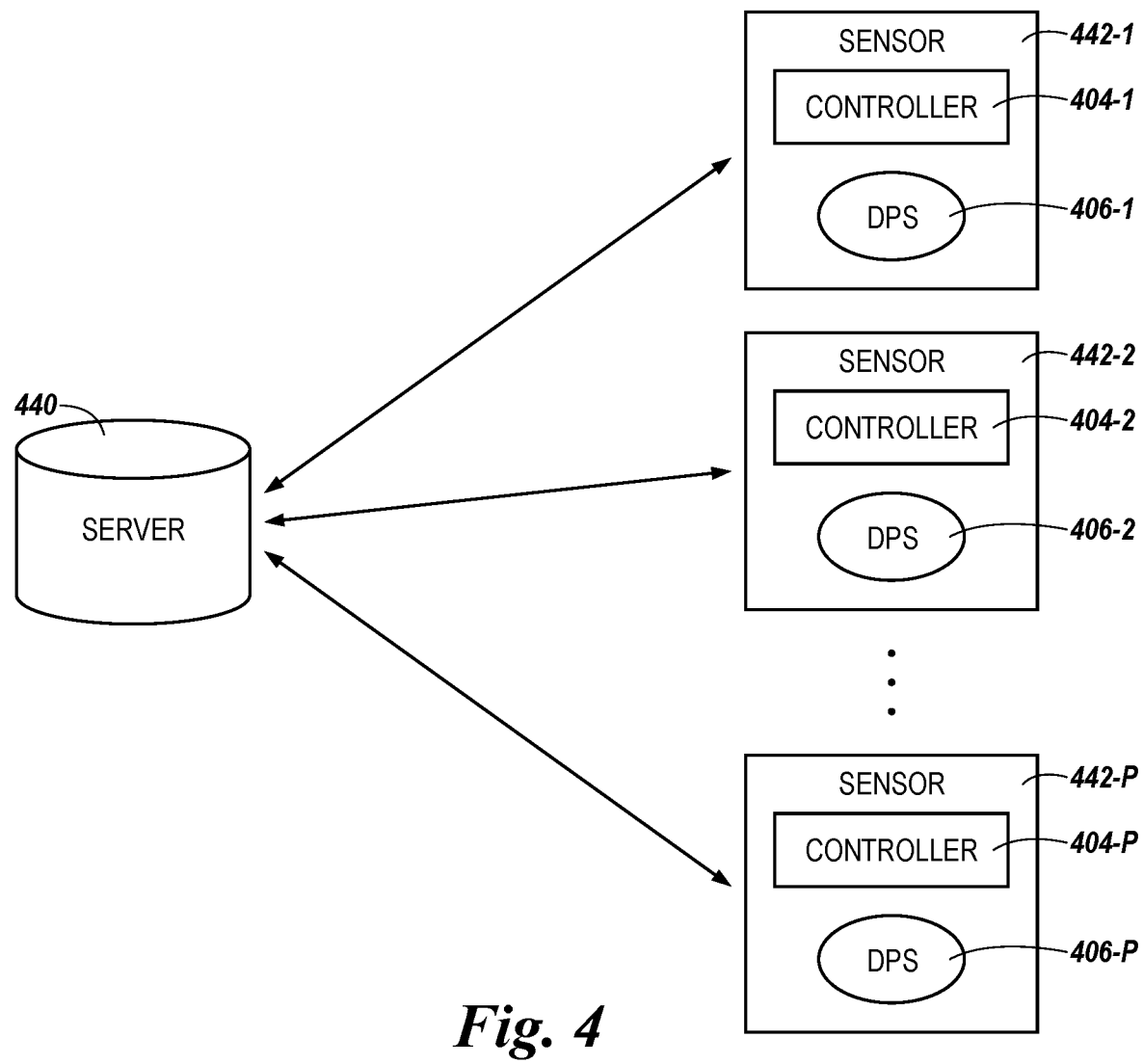
FIG. 4 is a diagram of an example system including a server and sensors having devices and controllers in accordance with a number of embodiments of the present disclosure.

FIG. 4 is a diagram of an example system including a server 440 and sensors 442-1, 442-2, 442-P having devices (illustrated in FIG. 4 as DPSes 404-1, 404-2, . . . , 404-P) and controllers 406-1, 406-2, . . . , 406-P in accordance with a number of embodiments of the present disclosure. In the example illustrated in FIG. 4, the sensors 442 can be edge devices such that the sensors are deployed in large numbers to collect data and report the data back to the server 440. Each sensor 442 can include a controller 404 communicatively coupled to a DPS 406. Subsequent to a sensor 442 collecting raw data (e.g., temperature, humidity, etc.) at the controller 406, the raw data can be transmitted from the controller 404 to the DPS 406 and modified at the DPS 406. For instance, the raw data may be converted from an analog format to a digital format.

Modifying the data at the DPSes 406 prior to transmitting the data to the server 440 can increase security and reduce cost by avoiding sending the raw data to a third-party data modification service. For instance, by reducing the time and distance traveled by the data (raw or modified) lost and/or corrupt data can be reduced. In some examples, bandwidth use can be reduced, as relevant data is transmitted to the server 400; for instance, irrelevant data may be filtered out during data modification at the DPSes 406. In some examples, data transmitted to/from the server 400 may be transmitted at particular time intervals. For instance, multiple blocks of data modified at one or more of the DPSes 406 may be compressed into a single block of data before being transmitted to the server 440 via a controller 404 at the particular time interval.

In a non-limiting example, the sensors 442 may collect machine temperature data every second at the controllers 404, but only particular data associated with the temperature data may be relevant for a machine health monitor (e.g., maximum temperature, minimum temperature, median temperature, etc.). In such an example, the DPSes 406 can modify the data such that only data deemed relevant is transmitted to the server 440 for further computing, and the data may be sent at intervals greater than the one second interval at which data is received at the controllers 404. While sensors 442 are illustrated in FIG. 4, other edge devices and/or applications may be used.

Figure 5:
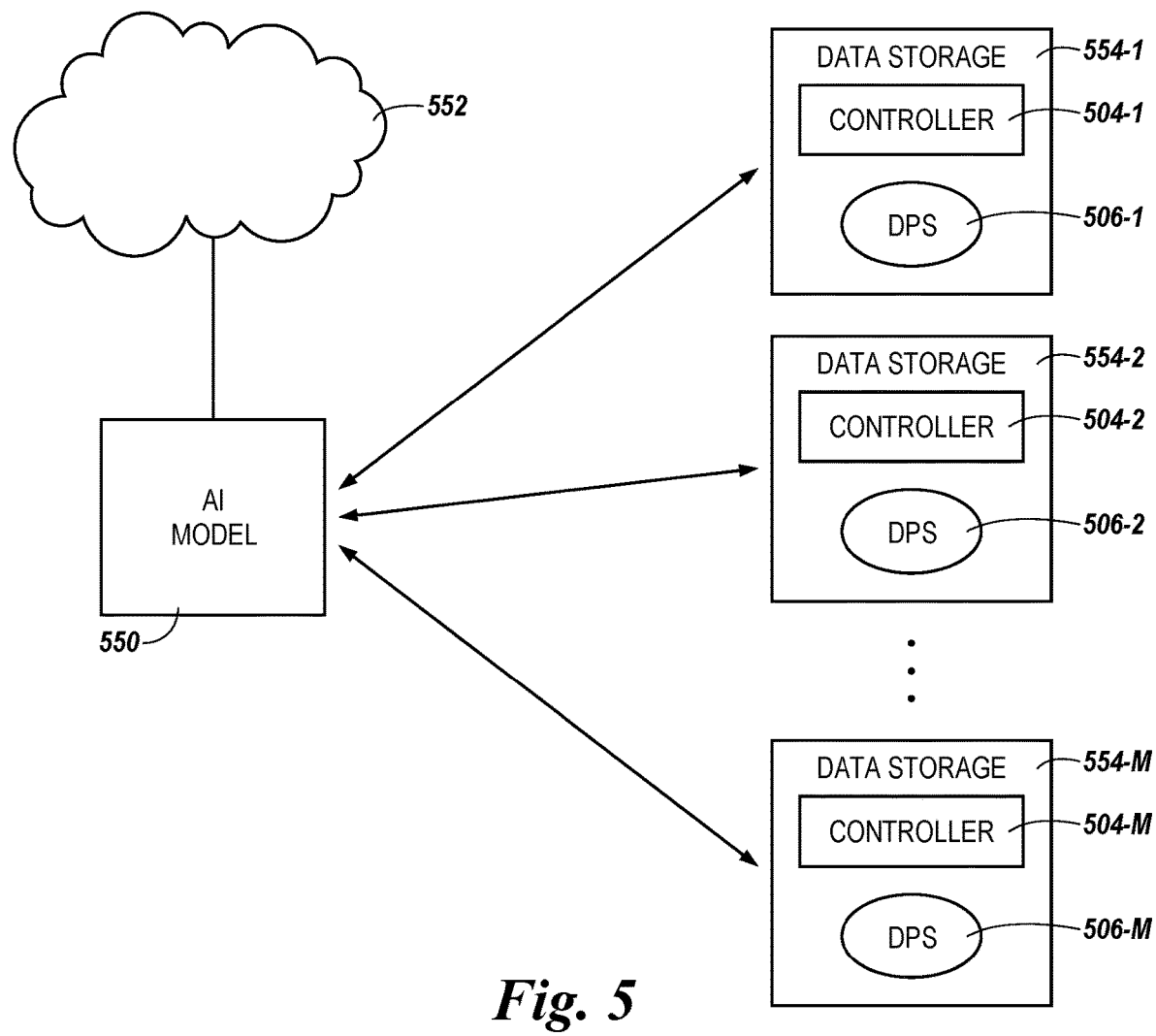
FIG. 5 is a diagram of an example system including an artificial intelligence (AI) model and data storage devices having devices and controllers in accordance with a number of embodiments of the present disclosure.

FIG. 5 is a diagram of an example system including an AI model 550 and data storage devices 554-1, 554-2, ..., 554-M having devices (illustrated in FIG. 5 as DPSes 506-1, 506-2, ..., 506-P) and controllers 504-1, 504-2, ..., 504-P in accordance with a number of embodiments of the present disclosure. The AI model 550, can be associated with an AI host 552 such as a cloud service (e.g., a cloud computing provider).

In the example illustrated in FIG. 5, the data storage devices 554 (e.g., data nodes) can be data storage devices of a user (e.g., company, individual, etc.) associated with an AI host 552. For example, an online streaming service may have a data storage device associated with a cloud service with which data is transmitted. Data storage devices 554 can store data from different companies, corporations, government entities, individuals, etc. or may store data from a same user.

Each data storage device 554 can include a controller 504 communicatively coupled to a DPS 506. Subsequent to a data storage device 554 receiving raw data at the controller 504, the raw data can be transmitted from the controller 504 to the DPS 506 and modified at the DPS 506. For instance, the raw data may be sequenced, outlier data or other irrelevant data may be removed, or the raw data may be modified for use in the AI model 550.

Modifying the data at the DPSes 506 prior to running the data through the AI model 550 (e.g., on or off the data storage devices 554) or transmitting the data to AI host 552 for application of the AI model 550, can increase security and reduce cost by avoiding sending the raw data to a third-party data modification service. For instance, by reducing the time and distance traveled by the data (raw or modified) lost and/or corrupt data can be reduced. In some examples, bandwidth use can be reduced, as applicable data is run through the AI model 550, transmitted to the AI host 552, or a combination thereof. In some examples, data transmitted to/from the AI host 552 may be transmitted at particular time intervals. For instance, multiple blocks of data modified at one or more of the DPSes 506 may be compressed into a single block of data before being transmitted to the AI host 552 via a controller 504 at the particular time interval.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, at a first controller of a first data preparation slice device, first data associated with a read command or write command transmitted to a first memory resource;
   receiving, at a second controller of a second data preparation slice device, second data associated with a read command or write command transmitted to a second memory resource;
   modifying the first data at the first data preparation slice and the second data at the second data preparation slice using logic communicatively coupled to the first controller and the second controller before transmitting the first and the second data to a host or image sensor or before writing the data to the first memory resource and the second memory resource, wherein the modification comprises filtering out irrelevant data;
   transmitting the modified first data and the modified second data to a combined data preparation slice for combination; and
   transmitting, at particular time intervals as the combined modified first data and modified second data is received, the combined modified first data and modified second data as relevant data blocks to the host or image sensor or writing the data to the first or the second memory resource based at least in part on the read command or the write command.

2. The method of claim 1, further comprising:
   receiving the first data at the first controller from a cloud service; and
   further modifying the first data by removing a portion of the first data, correcting the first data, standardizing the first data, masking the first data, or a combination thereof.

3. The method of claim 1, further comprising:
   receiving the first data at the first controller from the host;
   further modifying the first data by removing a portion of the first data, correcting the first data, standardizing the first data, masking the first data, or a combination thereof; and
   encrypting, encoding, and writing the modified first data to the first memory resource for storage.

4. The method of claim 1, further comprising:
   receiving the first data as image data at the first controller from the image sensor;

modifying the image data by removing one or more bits from the image data, reordering one or more bits of the image data, changing a format of the image data, or any combination thereof; and encrypting, encoding, and writing the modified image data to the first memory resource for storage.

5. The method of claim 1, wherein:

receiving the first data at the first controller of the first data preparation slice device comprises receiving the first data at the first controller of a sensor of an edge device; and transmitting the modified first data to a server communicatively coupled to the sensor.

6. The method of claim 1, wherein:

receiving the first data at the first controller of the first data preparation slice device comprises reeving the first data at the first controller of a data node associated with an artificial intelligence (AI) host; and transmitting the modified first data to the AI host communicatively coupled to the data node.

7. A system, comprising:

a first memory resource, comprising:
  a first controller configured to manage first data associated with the first memory resource; and
  a first data preparation slice device communicatively coupled to the first controller and configured to modify the first data before transmitting the first data, as relevant data blocks, to a combined data preparation slice and a host or image sensor or before writing the first data to the first memory resource, wherein the modification comprises filtering out irrelevant data by removing one or more bits from the first data, reordering one or more bits of the first data, changing a format of the first data, or any combination thereof;

a second memory resource, comprising:
  a second controller configured to manage second data associated with the second memory resource; and
  a second data preparation slice device communicatively coupled to the second controller and configured to modify the second data before transmitting the fi second rst data, as relevant data blocks, to the combined data preparation slice and the host or image sensor or before writing the second data to the second memory resource, wherein the modification comprises filtering out irrelevant data by removing one or more bits from the second data, reordering one or more bits of the second data, changing a format of the second data, or any combination thereof.

8. The system of claim 7, wherein the first data preparation slice device configured to modify the first data further comprises the first data preparation slice device configured to sequence the first data.

9. The system of claim 7, wherein the first memory resource is communicatively coupled to the host via a storage interface.

10. The system of claim 7, wherein the first controller configured to manage the first data further comprises the first controller configured to encode and encrypt the modified first data.

11. The system of claim 7, wherein the first controller configured to manage the first data further comprises the first controller configured to receive the first data from a host communicatively coupled to the first memory resource and transmit it to the first data preparation slice device for modification.

12. The system of claim 7, wherein the first controller configured to manage the first data further comprises the first controller configured to receive the modified first data from the first data preparation slice device and transmit it to a host communicatively coupled to the first memory resource.

13. The system of claim 7, wherein the first data preparation slice device is a hardware intelligent chip.

14. The system of claim 7, wherein the first data preparation slice device is a hardware accelerator.

15. A system, comprising:

a storage device communicatively coupled to a host and comprising:

a first memory resource, comprising:
  a first controller configured to receive first data associated with a read command or write command transmitted to the first memory resource and manage the first data associated with the first memory resource; and
  a first device communicatively coupled to the first controller and configured to modify the first data associated with the first memory resource, wherein the modification comprises filtering out first irrelevant data by removing one or more bits from the first data, reordering one or more bits of the first data, changing a format of the first data, or any combination thereof;

a second memory resource, comprising:
  a second controller configured to receive second data associated with a read command or write command transmitted to the second memory resource and manage the second data associated with the second memory resource; and
  a second device communicatively coupled to the second controller and configured to modify the second data associated with the second memory resource, wherein the modification comprises filtering out second irrelevant data by removing one or more bits from the second data, reordering one or more bits of the second data, changing a format of the second data, or any combination thereof; and a combined data preparation slice device configured to collect and combine the first data modified by the first device and the second data modified by the second device and transmit the combined modified data to the host.

16. The system of claim 15, further comprising:

the first memory resource configured to store a first data type; and the second memory resource configured to store a second data type.

17. The system of claim 15, wherein the storage device is a solid-state drive (SSD), the first memory resource is a volatile memory device, and the second memory resource is a non-volatile memory device.

18. The system of claim 15, wherein the combined modified data is transmitted to the host at particular time intervals.

19. The system of claim 15, wherein:

the first device comprises a first processing resource and logic to modify the first data associated with the first memory resource; and the second device comprises a second processing resource and logic to modify the second data associated with the second memory resource.

* * * * *